United States Patent [19]
Johnson et al.

[11] Patent Number: 5,428,795
[45] Date of Patent: Jun. 27, 1995

[54] METHOD OF AND APPARATUS FOR PROVIDING AUTOMATIC SECURITY CONTROL OF DISTRIBUTIONS WITHIN A DATA PROCESSING SYSTEM

[75] Inventors: William J. Johnson, Flower Mound; Larry M. Lachman, Irving, both of Tex.

[73] Assignee: International Business Machines Corporation, Roanoke, Tex.

[21] Appl. No.: 923,694

[22] Filed: Jul. 31, 1992

[51] Int. Cl.$^6$ ............ H04L 9/00; G06F 12/14; G06F 13/38
[52] U.S. Cl. ............ 395/725; 395/600; 380/4; 380/25; 340/825.31; 340/825.34; 364/286.4; 364/286.5; 364/264; 364/264.5; 364/222.5; 364/222.6; 364/DIG. 1
[58] Field of Search ............ 380/3, 4, 25, 49; 395/725, 375, 425, 600, 575, 800; 340/825.34, 825.31, 825.34

[56] References Cited

U.S. PATENT DOCUMENTS

| | | | |
|---|---|---|---|
| 4,104,721 | 8/1978 | Markstein et al. | 395/375 |
| 4,271,482 | 6/1981 | Giraud | 235/380 |
| 4,471,163 | 9/1984 | Donald et al. | 380/4 |
| 4,701,840 | 10/1987 | Boebert et al. | 395/800 |
| 4,713,753 | 12/1987 | Boebert et al. | 395/425 |
| 4,947,318 | 8/1990 | Mineo | 354/200 |
| 5,032,979 | 7/1991 | Hecht et al. | 395/575 |
| 5,056,009 | 10/1991 | Mizuta | 395/425 |
| 5,075,845 | 12/1991 | Lai et al. | 395/425 |
| 5,126,728 | 6/1992 | Hall | 340/825.3 |
| 5,163,147 | 11/1992 | Orita | 395/600 |
| 5,265,221 | 11/1993 | Miller | 395/725 |
| 5,265,245 | 11/1993 | Nordstrom et al. | 395/600 |
| 5,291,598 | 3/1994 | Grundy | 395/650 |
| 5,315,655 | 5/1994 | Chaplin | 380/4 |
| 5,317,729 | 5/1994 | Mukherjee et al. | 395/600 |

OTHER PUBLICATIONS

International Business Machines Corporation CP Command and Utility Reference, Release 1 IBM No. SC24-5519-00, Published Mar., 1991 at Endicott, N.Y.

M. G. Sobell A Practical Guide to UNIX System V, Second Edition Published 1991 at Redwood City, Calif.

J. S. Langford, D. H. Steves, and K. C. Witte "Administrative Role Configuration with Privilege Control Lists" IBM Technical Disclosure Bulletin, vol. 34, No. 7B, pp. 110–113, Published Dec., 1991 at Armonk, N.Y.

D. H. Steves, and K. C. Witte "Logically Extensible Privilege Control Set" IBM Technical Disclosure Bulletin, vol. 34, No. 7B, pp. 106–109, Published Dec., 1991 at Armonk, N.Y.

D.H. Steves, and K. C. Witte "Trojan Horse and Virus Detection Using Real Time Auditing" IBM Technical Disclosure Bulletin, vol. 34, No. 7B, pp. 78–81, Published Dec., 1991 at Armonk, N.Y.

W. Schwendemann, and P. Wang "C2 Audit Filter" IBM Technical Disclosure Bulletin, vol. 34, No. 5, pp. 104–106, Published Oct., 1991 at Armonk, N.Y.

C. J. Bracht, W. M. Edwards, R. Hoffman, and J. Ibanez "Process-Driven Logon and Logoff As Opposed to User-Driven" IBM Technical Disclosure Bulletin, vol. 33, No. 8, pp. 183–185, Published Jan., 1991 at Armonk, N.Y.

P. H. Kramer "Enhanceable Authorization Mechanism" IBM Technical Disclosure Bulletin, vol. 30, No. 1, pp. 179–181, Published Jun., 1987 at Armonk, N.Y.

H. E. Frye, and R. L. Hoffman "Symbolic Machine Security Feature Implementation" IBM Technical Disclosure Bulletin, vol. 18, No. 9, pp. 3015–3017, Published Feb., 1976 at Armonk, N.Y.

*Primary Examiner*—Gopal C. Ray
*Attorney, Agent, or Firm*—Geoffrey A. Mantooth

[57] ABSTRACT

Automatic detection of security violation objects within distributions and appropriate handling of those violations is provided. A confidential object dictionary contains definitions of objects which violate security. Distributions are automatically searched for objects contained in the dictionary. A violation log may be used for summarizing violations and determining an appropriate predefined action for a violation. The appropriate predefined action for a violation may include third party notification, notifying third parties in priority order, safe storing the violation, or inhibiting distribution of the violation.

25 Claims, 4 Drawing Sheets

METHOD OF AND APPARATUS FOR PROVIDING AUTOMATIC SECURITY CONTROL OF DISTRIBUTIONS WITHIN A DATA PROCESSING SYSTEM

TECHNICAL FIELD OF THE INVENTION

This invention relates in general to data processing systems, and in particular to a method of, and apparatus for, providing automatic detection of a distribution of a security violation object within a data processing system.

BACKGROUND OF THE INVENTION

Existing data processing systems may provide capabilities for system security. These system security capabilities may control system users, system resources, or system information.

System user oriented security may limit system access to only those users authorized to use the system. Existing system user oriented security is demonstrated by operating system commands such as the International Business Machines Corporation "VM/ESA" TM Operating System LOGON command and the Unix Systems Laboratories "UNIX" TM Operating System LOGIN command.

System resource oriented security may limit the access and use of a system resource to only those users authorized to use the system resource. Existing system resource oriented security is demonstrated by operating system commands such as the "VM/ESA" Operating System LINK command and the "UNIX" Operating System file permissions.

System information oriented security may search system files to locate any unauthorized information within the system, such as a computer virus. Existing system information oriented security is demonstrated by operating system commands such as the "VM/ESA" Operating System SCANFILE command and the "UNIX" Operating System GREP command.

However, when one desires to control the distribution of information to, within, or from a data processing system based on the information content, no capability is provided by the previously described existing systems. If one desires to prevent the unauthorized distribution of restricted information into a data processing system, or prevent the unauthorized distribution of restricted information within a data processing system, or prevent the unauthorized distribution of restricted information from a data processing system, then the previously described existing systems fail to prevent these distributions. This is a problem when the restricted information is a valuable asset and the unauthorized distribution may compromise the value of the restricted information.

For a situation which may call for a user needing automatic security control over distributions in a data processing system, consider the following. Maintaining security is an integral part of any business. Competition among companies makes it very important to keep research, development materials, business direction information and other confidential information secure and safe from unauthorized people and systems. However, the networking of data processing systems makes it difficult to control the distribution of such confidential information. A business would prefer to be able to automatically monitor information distributions to, from, and within such data processing systems to ensure security. In addition, the multimedia nature of some data processing systems makes it difficult to control the distribution of such confidential information. Different types of media such as voice, text, graphics, etc. can contain confidential information. A method is needed to monitor confidential information in a variety of media (voice, text, graphics, etc.), in a variety of environments (networks, phone systems, host systems and stand alone computers), and in a variety of input and output devices available for communicating and managing information.

The existing approaches described above fail to meet the needs of the above situation and present the user with five difficulties. The first difficulty is that existing approaches fail to provide a capability for defining a distribution which constitutes a security violation. The second difficulty is that existing approaches fail to provide a capability for detecting a security violation distribution. The third difficulty is that existing approaches fail to provide a capability for handling the unauthorized distribution of a security violation distribution either into, within, or from a data processing system. The fourth difficulty is that existing approaches fail to provide a capability for either inhibiting, reporting, or logging the unauthorized distribution of a security violation distribution. The fifth difficulty is that existing approaches fail to provide a capability for prioritizing potential actions in response to the unauthorized distribution of a security violation distribution.

Thus, the existing systems described above provide no method of, or apparatus for, automatic detection of a distribution of a security violation object within a data processing system. As such, there is a need for a method of, and apparatus for, providing automatic detection of a distribution of a security violation object within a data processing system.

SUMMARY OF THE INVENTION

The invention disclosed herein comprises a method of, and apparatus for, providing automatic detection of security violation objects within distributions and appropriate handling of those violations. The method and apparatus described herein substantially eliminate or reduce the difficulties of maintaining security over distributions of registered objects in a data processing system.

Automatic detection of security violation objects within distributions and appropriate handling of those violations is provided. A confidential object dictionary contains definitions of objects which violate security. Distributions are automatically searched for objects contained in the dictionary. A violation log may be used for summarizing violations and determining an appropriate predefined action for a violation. The appropriate predefined action for a violation may include third party notification, notifying third parties in priority order, safestoring the violation, or inhibiting distribution of the violation.

The present invention has the advantage of providing a capability for defining a distribution which constitutes a security violation.

The present invention has the further advantage of providing a capability for detecting a security violation distribution.

The present invention has the still further advantage of providing a capability for handling the unauthorized distribution of a security violation distribution either into, within, or from a data processing system.

The present invention has the still further advantage of providing a capability for either inhibiting, reporting, or logging the unauthorized distribution of a security violation distribution.

The present invention has the still further advantage of providing a capability for prioritizing potential actions in response to the unauthorized distribution of a security violation distribution.

The present invention has the still further advantage of operating discretely such that users on a network are unaware of its operation until a violation has been detected and notification administrated.

BRIEF DESCRIPTION OF THE DRAWINGS

For a more complete understanding of the present invention and the advantages thereof, reference is now made to the Detailed Description in conjunction with the attached Drawings, in which:

FIG. 3 also illustrates the operations preferred in carrying out the Security Violation Notification Process for less severe security violations.

DETAILED DESCRIPTION OF THE INVENTION

Figure 1:
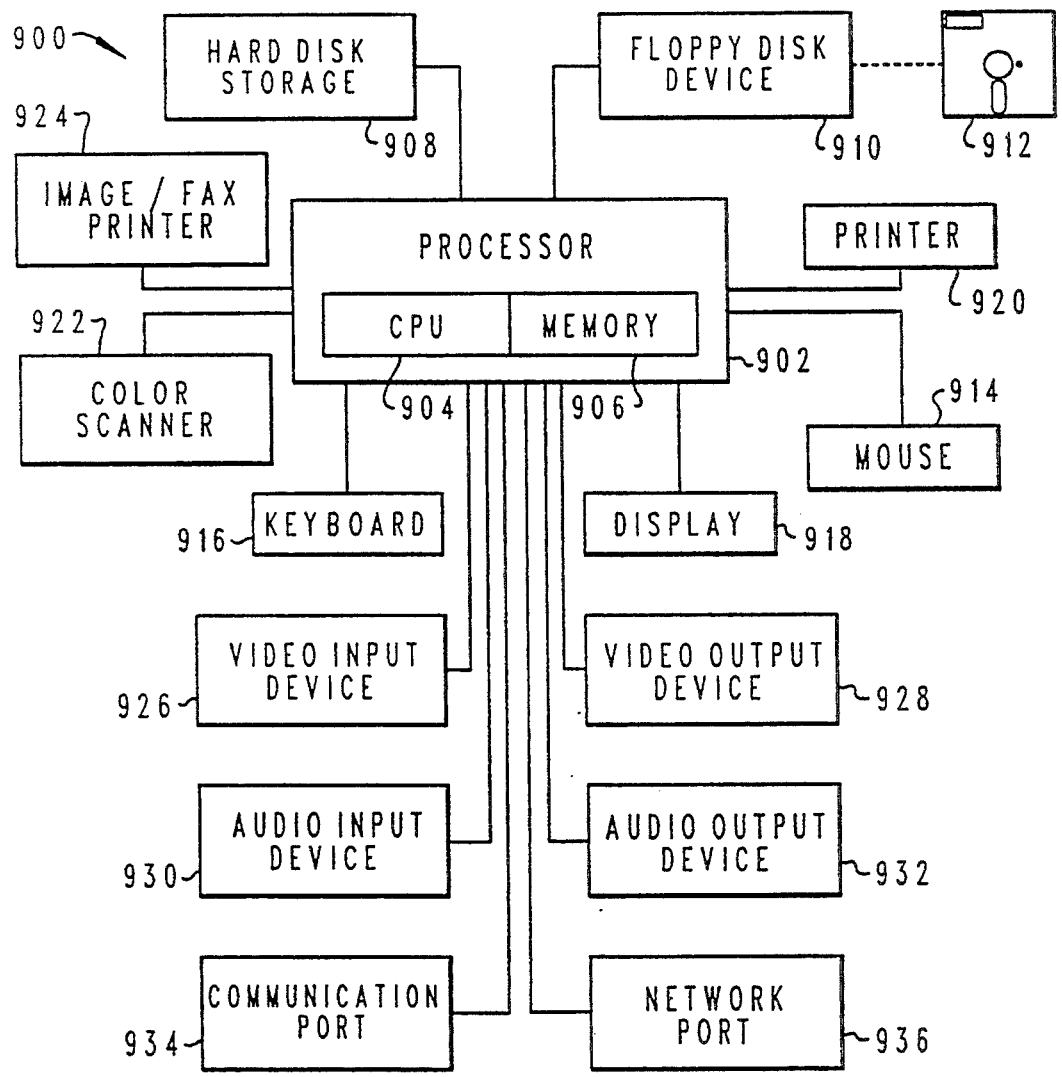
FIG. 1 is a block diagram of a data processing system used in performing the method of the present invention and forming part of the apparatus of the present invention.

Referring first to FIG. 1, there is shown in block diagram form, a data processing system 900 according to the present invention. The data processing system 900 includes a processor 902, which includes a central processing unit (CPU) 904, and a memory 906. Additional memory, in the form of a hard disk file storage 908 and a floppy disk device 910, may be connected to the processor 902. Floppy disk device 910 may receive a diskette 912 which has computer program code recorded thereon that implements the present invention in the data processing system 900. The data processing system 900 may also include user interface hardware, including a mouse 914 and a keyboard 916 for allowing user input to the processor 902 and a display 918 for presenting visual data to the user. The data processing system may also include a printer 920 for printing information. The data processing system 900 may also include image devices, including a scanner 922 for scanning images into the data processing system 900 and an image/fax printer 924 for printing images. The data processing system 900 may also include video devices, including a video input device 926 for entering video into the data processing system 900 and a video output device 928 for displaying video. The data processing system 900 may also include audio devices, including an audio input device 930 for entering audio into the data processing system 900 and an audio output device 932 for reproducing audio. The data processing system 900 may also include communication devices, including a communications port 934 for communicating with another system and a network port 936 for communicating with a network.

Figure 2:
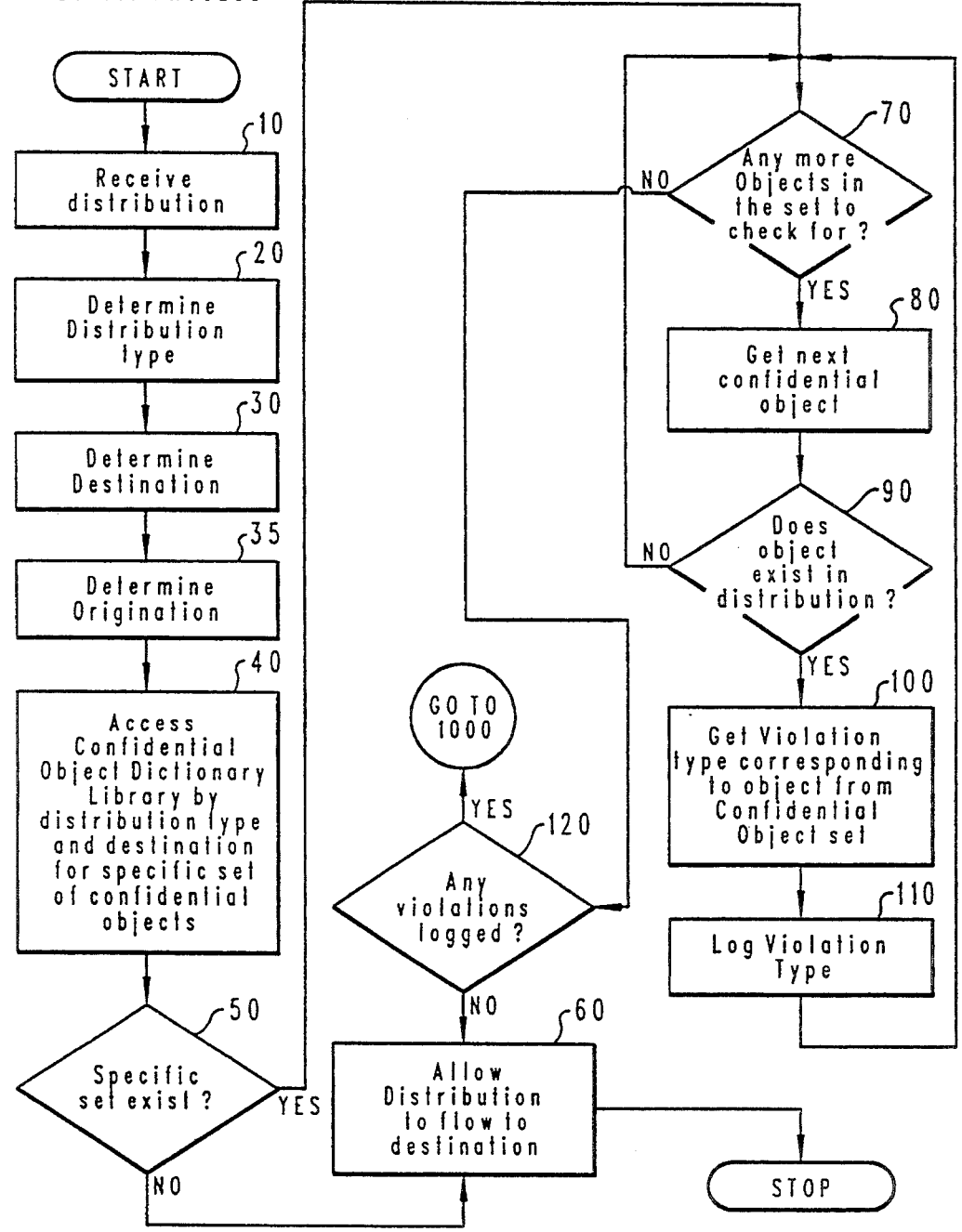
FIG. 2 is a flow chart illustrating the operations preferred in carrying out the Security Violation Detection Process portion of the present invention.
Figure 3:
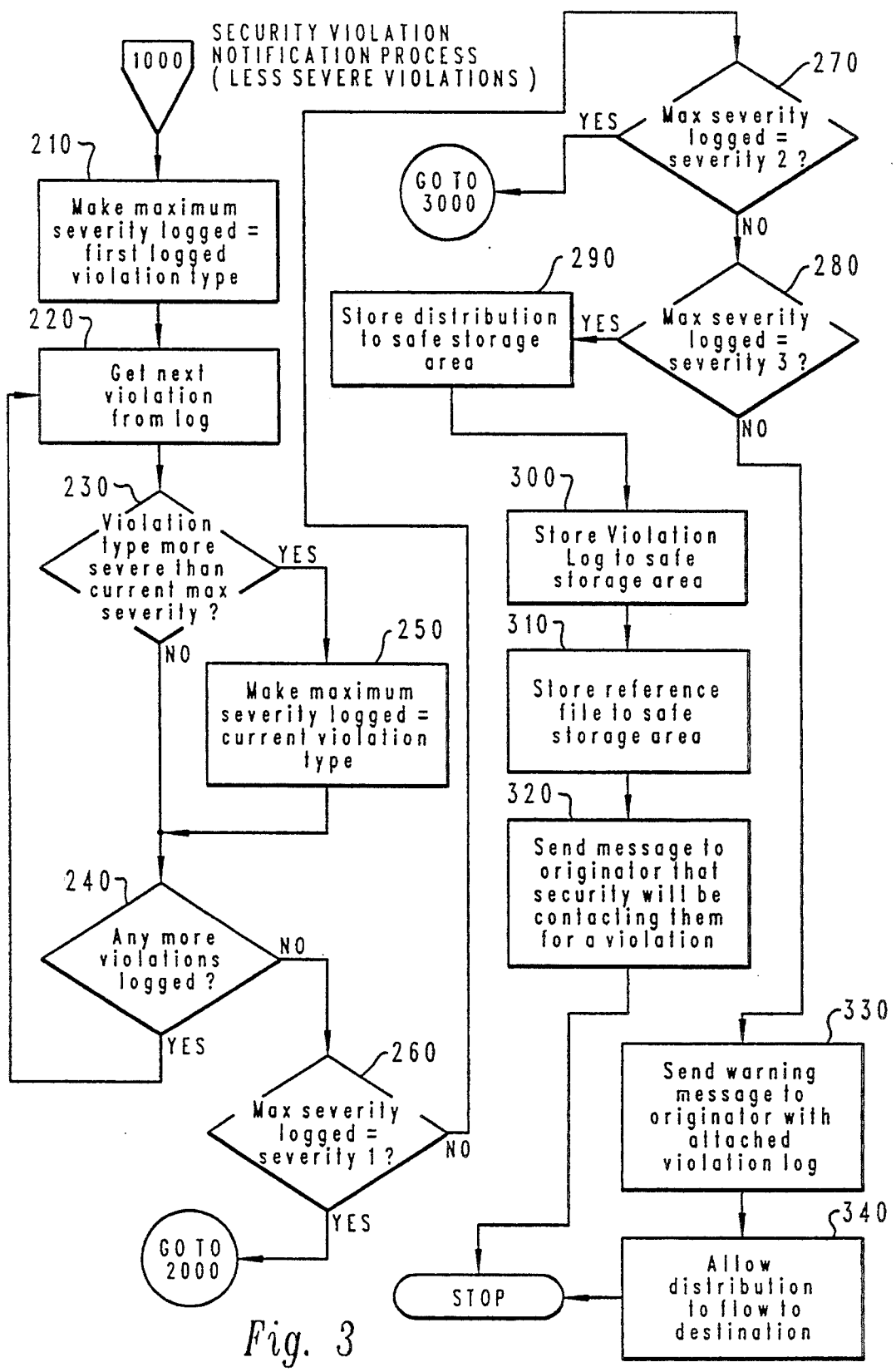
FIG. 3 is a flow chart, continued from FIG. 2, illustrating the operations preferred in carrying out the Security Violation Notification Process portion of the present invention.
Figure 4:
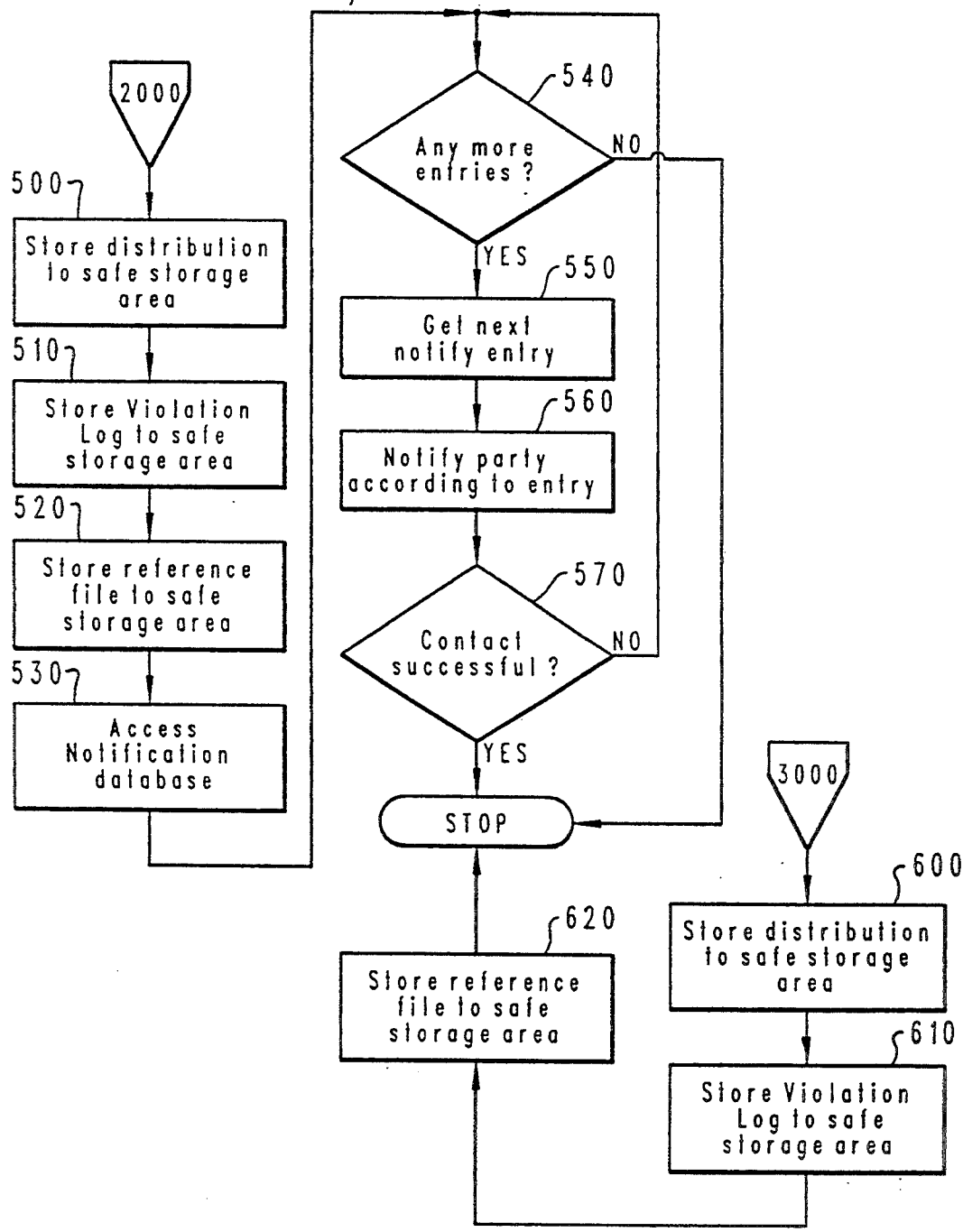
FIG. 4 is a flow chart, continued from FIG. 3, illustrating the operations preferred in carrying out the Security Violation Notification Process for more severe security violations.

Referring now to FIG. 2 through FIG. 4, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

The operations preferred in carrying out the present invention are implemented as two processes or programs comprising a Security Violation Detection Process and a Security Violation Notification Process. The Security Violation Detection Process, illustrated in FIG. 2, detects distributions of security violation objects. The Security Violation Notification Process, illustrated in FIG. 3 and FIG. 4, determines and executes a predefined action for the detected security violation object. The portion of the Security Violation Notification Process, illustrated in FIG. 3, determines and executes a predefined action for a less severe security violation. The portion of the Security Violation Notification Process, illustrated in FIG. 4, determines and executes a predefined action for a more severe security violation.

Referring now to FIG. 2, which illustrates the operations preferred in carrying out the Security Violation Detection Process portion present invention, after the start of the program, process block 10 receives a distribution. A distribution is a data stream of arbitrary media. Process block 10 may be located on an originating system or device, located at a receiving system or device, or located between communicating entities within the path of communications between systems. Reception is preferably completely unknown by both sender and recipient of a distribution. Upon reception of data, process block 20 determines the type of distribution. Distribution types include text, binary, audio, video, analog, etc. Process block 20 determines the type by checking associated distribution attributes such as document type. The type may be implicit by the location of the present invention such as would be the case when the invention is running on a receiving system, device or the like. For example, locating the present invention at a laser printer will involve interrogating a particular print format, hence the distribution type. Processing continues to process block 30 where the destination is determined. In the preferred embodiment, destination information is retrieved from associated addressing attributes such as recipients (e.g. mailed to all users at node identifier DALHQIC1). An alternative embodiment may focus on individual user identifiers (USER2 @ NODE5 @ TEXAS @ U.S.). Alternative embodiments may also deduce destination by determining the distribution type being received. Destination information may also be implicit by the location of the present invention such as would be the case when the invention is running on a particular receiving system, device or the like. For example, locating the present invention at a facsimile machine means the destination is the facsimile machine itself.

After receiving a distribution and determining type and destination, the processing continues with process block 35 and the originator of the distribution is determined (e.g. user identifier such as JOHNDOE @

DALHQIC2). The originator is used by subsequent processing in case a message must be sent back to the originator. Control flows to process block 40 which accesses a CONFIDENTIAL OBJECT DICTIONARY LIBRARY for a set of registered objects determined by distribution type and destination.

The preferred embodiment of the Confidential Object Dictionary Library is a database of records. Each record in the preferred embodiment of the database contains three fields: an Address field, a Data type field and an Object Description List field.

The Address field contains destination information for where interrogated distributions are bound. An Address field may be a system node identifier (e.g. SYSNODE1) in which case all distributions bound for any user or device on that node shall be searched according to an appropriate record with the matching node identifier. An Address Field may also be a user address (e.g. JOHNDOE @ SYSNODE2) in which case records with the address are used for distributions bound to the specific user address. Those skilled in the art recognize an Address may be logical or physical and may take a variety of environment adaptations without departing from the spirit and scope of the invention.

The Data Type field contains a specific data type such as TEXT, DIGITIZED VOICE, IMAGE, PRINT FORMAT XYZ, etc. A data type may or may not be dependent on the Address field. There may be many supported data types for an Address. Thus, there may be many records with the same Address field and different Data Type fields.

The Object Description List field contains a list of elements wherein each element is a pair. The first part of the pair is an object to be searched for within automatically interrogated distributions and the second part is an assigned violation type. Objects are dependent on the Data Type field in the corresponding record. When the library record Data Type field is TEXT, an object would be a string such as "REDROVER" or "WINDFALL". The assigned Violation Type field is a constant which indicates to a security algorithm how to handle detection of the object in a distribution. Each element in the Object Description List field is said to be a registered object. Registered objects are searched for within distributions and, if found, are said to cause a security violation.

Distributions of a particular type within a network, destined for a particular recipient node identifier, have a unique set of objects to be used in searching within the distribution. A CONFIDENTIAL OBJECT DICTIONARY LIBRARY may contain two sets:

| | | |
|---|---|---|
| 1) DALHQIC1 : MAIL_NOTE | : NULL (i.e. none in list) | |
| 2) CONFNODE : MAIL_NOTE | : 'AQUAEDITOR'=SEVERITY1, 'WINDVANE'=SEVERITY2, 'REDROVER'=SEVERITY1 (i.e. top secret project names) | |

Set 1 would be used for all electronic mail notes routed to the DALHQIC1 system. Since there are no objects defined, all distributions will flow as secure, that is as not violating security. Set 2 would detect all mail notes routed to the CONFNODE system which contain the top secret project text strings 'AQUAEDITOR', 'WINDVANE' or 'REDROVER' as security violations. Distributions flowing to node identifiers not in the table are treated as non-violating. Those skilled in the art recognize various embodiments for specific user identifier (USERI@NODE1) destinations as well as specific logical or physical network addresses.

After query to the CONFIDENTIAL OBJECT DICTIONARY LIBRARY, processing continues to decision block 50 where the query results are analyzed for whether or not a set of search objects exists for the destination and data stream type. If a set does not exist, process block 60 allows the distribution to transmit to the destination and processing stops.

If in decision block 50, a set of search objects exists for the destination and data stream type, then processing continues to decision block 70. Decision block 70 determines if there are any more objects in the set for which to search. If decision block 70 determines there are no objects in the set remaining to be searched, then processing continues to decision block 120. Decision block 120 determines if violations have been logged. If violations have not been logged, then execution transfers to process block 60 where the distribution is allowed to transmit to the destination. Thereafter, processing stops.

Returning now to decision block 70, if more objects remain to be searched in the set retrieved from the CONFIDENTIAL OBJECT DICTIONARY LIBRARY, then processing continues to process block 80. Process block 80 retrieves the next object to search for from the set. If this is the first execution of process block 80 for a data stream received by process block 10, then the first object in the set is retrieved. Processing continues to decision block 90 where the current distribution is searched for the current object from said set. If the data stream does not contain the object, then processing loops back to decision block 70 where the set is checked for more objects for which to search. If there is another object, the process continues with process block 80 as previously described.

Returning now to decision block 90, if the current searched object is detected within the data stream, then processing continues to process block 100 where the matched object's violation type is retrieved. Thereafter, processing continues to process 110 where the violation type is logged in a VIOLATION LOG FILE. Thereafter, execution loops back to decision block 70 to determine if there are more objects for which to search. If another object in the set remains to be searched, process 80 retrieves the next object, and processes 90, 100, 110, 70 and 80 continue as previously described.

Returning now to decision block 120, if violations have been logged (if a VIOLATION LOG FILE exists), then processing continues to process block 210, on FIG. 3, where violations are appropriately handled. This processing path is illustrated by flow chart connecters 1000 on FIG. 2 and FIG. 3. The preferred embodiment of the VIOLATION LOG FILE contains entries including at least the object detected and the violation type such as:

| | |
|---|---|
| 1) 'AQUAEDITOR' | : VIOLATION SEVERITY 1 ! |
| 2) 'REDROVER' | : VIOLATION SEVERITY 1 ! |

Those skilled in the art recognize various embodiments of information format in the VIOLATION LOG FILE without departing from the spirit of the present invention.

Referring now to FIG. 3, the operations preferred in carrying out the Security Violation Notification Process portion of the present invention are described. The Security Violation Notification Process begins in process block 210 after control passes from decision block 120 on FIG. 2. This processing path is illustrated by flow chart connecters 1000 on FIG. 2 and FIG. 3. Process block 210 sets a maximum severity variable, representing a maximum severity logged in the VIOLATION LOG FILE, to the violation type of the first entry logged in the VIOLATION LOG FILE. Processing continues to process block 220 where the next logged entry is retrieved from the VIOLATION LOG FILE. During its first execution, process block 220 retrieves the first entry from the VIOLATION LOG FILE. Thereafter, decision block 230 compares the current logged violation from the retrieved entry with the current setting of the maximum severity variable. If the current logged violation is more severe than the maximum severity variable, then the maximum severity variable is set to the current logged violation type in process block 250. Process block 250 ensures that the maximum severity from all entries in the VIOLATION LOG FILE is saved in the maximum severity variable. After setting the maximum severity variable, execution proceeds to decision block 240 which determines if there are more violations logged in the VIOLATION LOG FILE. If there are more violations logged in the VIOLATION LOG FILE, processing loops back to process block 220 where the next violation log entry is retrieved for processing.

Returning now to decision block 230, if the currently checked violation is not of higher severity than the maximum severity variable, then execution continues to the decision block 240. Comparing severities can be performed by comparing numerics for violations types such as 1 for SEVERITY 1, 2 for SEVERITY 2, etc. Those skilled in the art recognize various arithmetic relationships can be used for comparing severities as well as knowing the severity for a particular type by virtue of a map. SEVERITY 1 may be mapped to a violation type in a table which can be changed independently of the CONFIDENTIAL OBJECT DICTIONARY LIBRARY. If another violation exists in the VIOLATION LOG FILE, at decision block 240, control returns to process block 220 and processing continues as previously described. If decision block 240 determines there are no more logged violations to process, then processing continues to decision block 260. By the time processing reaches decision block 260, the maximum severity violation type has been extracted from the VIOLATION LOG FILE.

If, in decision block 260, the maximum severity variable is not set equal to severity 1, then processing continues to decision block 270, Decision block 270 determines if the maximum severity variable is set equal to severity 2, the next severity type. If, in decision block 270, the maximum severity variable is not set to severity 2, processing continues to decision block 280 where the maximum severity variable is compared to severity 3, the next severity type. If, in decision block 280, the maximum severity variable is not set to severity 3, then processing continues to process block 330 where the lowest of violation severities is handled. Process block 330 sends a warning message, which was determined in process block 35 of FIG. 2, to the originator of the distribution (i.e. source address) containing the violation time and an attachment of the VIOLATION LOG FILE. The warning message may read like "PLEASE BE WARNED YOU ARE COMMUNICATING CONFIDENTIAL OBJECTS TO <destination determined from process block 30 in FIG. 2>." Thereafter, processing continues to process block 340 where the distribution is allowed to transmit to the intended destination. Thereafter, processing stops.

Returning now to decision block 280, if the maximum severity variable is set to severity 3, then processing continues to process block 290 where the distribution is stored in a SAFE STORAGE AREA. The distribution is stored there with a guaranteed unique name automatically generated (e.g. A5GYW23J). This prevents distributions from being stored there with the same name. The SAFE STORAGE AREA may be assumed to always contain sufficient storage space to facilitate discussion of the present invention. Various embodiments of the present invention may manage the SAFE STORAGE AREA so that errors are properly dealt with such that space is made available or appropriate notification is made to manage the storage problem while not losing a record of violation information. Thereafter, processing continues to process block 300 where the entire VIOLATION LOG FILE is stored with the same automatically generated distribution name and an extension of LOG (e.g. A5GYW23J.LOG). Thereafter, processing continues to process block 310 where a security officer REFERENCE FILE is stored in the SAFE STORAGE AREA. The REFERENCE FILE contains the aforementioned file name (e.g. A5GYW23J), a date/time stamp of the violations and the maximum severity detected. The REFERENCE FILE has a file name such as L0002345.VIO. Every REFERENCE FILE is generated by incrementing the numeric portion of the file name in sequence and then round-robbing when 7 digits of numerics are utilized. A security guard periodically polls the SAFE STORAGE AREA for presence of REFERENCE FILES. When finding one or more files, they are dealt with appropriately. Thereafter, processing continues to process block 320 where a message is sent to the originator of the distribution (which was determined in process block 35 of FIG. 2) stating the distribution was intercepted and redirected to a security officer because of one or more violations. An embodiment of a message sent back to an originator may be "A DISTRIBUTION SENT BY YOU HAS BEEN INTERCEPTED AND SAFE STORED FOR A SECURITY GUARD BECAUSE 0F ONE OR MORE VIOLATIONS." Alternate message embodiments may include the distribution name which was sent, intended recipients, etc. Thereafter, processing stops.

Note that processing paths leaving decision block 280 deal with minor security violations. The originator is notified and a substantially passive course of action is performed.

Returning now to decision block 270, if the maximum severity variable is set to severity 2, then processing continues to process block 600 on FIG. 4. This processing path is illustrated by flow chart connecters 3000 on FIG. 3 and FIG. 4.

Returning now to decision block 260, if a maximum severity violation was detected (if the maximum severity variable is set to severity 1), then processing continues to process block 500 on FIG. 4. This processing path is illustrated by flow chart connecters 2000 on FIG. 3 and FIG. 4.

Referring now to FIG. 4, after control passes from decision block 270 on FIG. 3, as illustrated by flow chart connecters 3000 on FIG. 3 and FIG. 4, to process block 600, process block 600 stores the distribution in the aforementioned SAFE STORAGE AREA. Process block 600 may also inhibit the distribution from flowing to its destination. The distribution is stored there with a guaranteed unique name automatically generated. This prevents distributions from being stored there with the same name. Thereafter, processing continues to process block 610 where the entire VIOLATION LOG FILE is stored with the same automatically generated distribution name and an extension of LOG. Thereafter, processing continues to process block 620 where a security officer REFERENCE FILE is stored in the SAFE STORAGE AREA. Thereafter, processing stops.

The REFERENCE FILE contains the generated distribution file name, a date/time stamp of the violations and the maximum severity detected. The process flow consisting of processing blocks 600, 610, and 620 handles a severity 2 violation whereby the originator is not notified with a message. Severity 2 type violations are severe enough to not let the originator know a violation was detected. The violation(s) can be handled by a security officer without letting the originator prepare for being confronted by a security officer.

Referring again to FIG. 4, after control passes from decision block 260 on FIG. 3, as illustrated by flow chart connecters 2000 on FIG. 3 and FIG. 4, to process block 500, process block 500 stores the distribution in the aforementioned SAFE STORAGE AREA. The distribution is stored there with a guaranteed unique name automatically generated. This prevents distributions from being stored there with the same name. Process block 500 may also inhibit the distribution from flowing to its destination. Thereafter, processing continues to process block 510 where the entire VIOLATION LOG FILE is stored with the same automatically generated distribution name and an extension of LOG. Thereafter, processing continues to process block 520 where a security officer REFERENCE FILE is stored in the SAFE STORAGE AREA The REFERENCE FILE contains the generated distribution file name, a date/time stamp of the violations, and the maximum severity detected. Thereafter, processing continues to process block 530 for appropriate handling of the most severe violation.

Process block 530 accesses a NOTIFICATION DATABASE. The NOTIFICATION DATABASE contains records for priority notification to a human such as a security officer. A NOTIFICATION DATABASE may contain records such as:

1) Call 817-SEC-URE1 with a security violation announcement voice message to be played to the recipient of the call. If the call is answered within four rings (i.e. means live person), then contact was successful. If the phone answers after the fourth ring (i.e. answer machine), then the call was unsuccessful. The voice message is left regardless.

2) Call 817-SEC-URE4 with a security violation announcement voice message to be played to the recipient of the call. If the call is answered within four rings (i.e. means live person), then contact was successful. If the phone answers after the fourth ring (i.e. answer machine), then the call was unsuccessful. The voice message is left regardless.

3) Call 817-SEC-URE5 with a security violation announcement voice message to be played to the recipient of the call. If the call is answered within four rings (i.e. means live person), then contact was successful. If the phone answers after the fourth ring (i.e. answer machine), then the call was unsuccessful. The voice message is left regardless.

4) Send an electronic mail note to a security officer. If the user is logged on, then the contact was successful. If not, then the contact was unsuccessful. The mail note is sent regardless.

5) Send a fax to 214-FAX-SECY with a banner page which says "!!!! SEVERITY 1 VIOLATION DETECTED—IMMEDIATELY CONSULT SAFE STORAGE AREA !!!!". If the fax is down, the send was successful. If the fax is up, the send is successful.

The NOTIFICATION DATABASE contains records which indicate a priority of notifications to perform. Starting with the first entry, every entry is processed in order until an entry is successful in notifying the specified party. The NOTIFICATION DATABASE should be configured such that eventually a human is guaranteed to be contacted. Those skilled in the art recognize arbitrary media and destination devices which are accessible to the reporting means can be configured in the NOTIFICATION DATABASE.

Processing continues from process block 530 to decision block 540 where presence of entries configured in the NOTIFICATION DATABASE is checked. If there are no entries in the NOTIFICATION DATABASE, processing stops because there is no means to notify anyone or anything. If decision block 540 finds an entry in the NOTIFICATION DATABASE, processing continues to process block 550 where the next entry is obtained from the NOTIFICATION DATABASE. During its first execution, process block 550 obtains the first entry from the NOTIFICATION DATABASE. Thereafter, processing continues to process block 560 where the appropriate action is taken according to the NOTIFICATION DATABASE record as previously described. After contacting the party described in the NOTIFICATION DATABASE entry, processing proceeds to decision block 570. If, in decision block 570, contact was successful as described by the NOTIFICATION DATABASE entry, processing stops. Eventually, the party contacted will poll the SAFE STORAGE AREA for violation details. If, in decision block 570, contact was unsuccessful as described in the NOTIFICATION DATABASE, then processing loops back to decision block 540 to check for more NOTIFICATION DATABASE entries. If all entries are processed, processing stops. Otherwise, the next entry is retrieved in process block 550 and processing resumes as previously described until either a successful contact is made or all entries are processed.

Referring now back to FIG. 3, the flow chart demonstrates four types of severity. It is conceivable to have more or less than four types of severity whereby processing covered by decision blocks 260, 270 and 280 could be extended with many decision blocks to provide handling of many violations types. The preferred embodiment described in FIG. 3 demonstrates only four types of violations, although alternative embodiments may implement more types of violations.

Referring now to FIG. 2, those skilled in the art recognize an alternative embodiment, within the scope of the present invention, could implement FIG. 2 processing to process segments of a data stream real time as they are being transmitted. Communications protocols customarily communicate data in predefined buffer sizes. There may be many full buffers of data making up a distribution. FIG. 2 processing can process a full buffer of data at a time during real time communications between some points of reference.

In yet another alternative embodiment, decision block 120 would process only after all segments of the entire distribution have been processed.

Although the present invention has been particularly shown and described with reference to a preferred embodiment, it will be understood by those skilled in the art that various changes in form and detail may be made without departing from the spirit and scope of the invention.

What is claimed is:

1. A method of monitoring security of a registered object distributed in a data processing system, said method being executed on said data processing system and comprising the steps of:
   accessing a library containing a description of the registered object;
   receiving a distribution that is sent by an originator to a recipient;
   determining if the registered object is present in said distribution; and
   executing a predefined action if the registered object is present in the distribution by providing notification of the distribution to a party.

2. The method of claim 1, wherein the library includes a destination indicator for the registered object, a data stream type for the registered object, and an assigned violation type for the registered object.

3. The method of claim 1, wherein the step of executing a predefined action if the registered object is present in the distribution includes inhibiting the distribution.

4. The method of claim 1, wherein the step of executing a predefined action if the registered object is present in the distribution includes safe storing the distribution.

5. The method of claim 1, wherein the step of notifying a party of the distribution is dependent on an outcome of a prior notification to another party.

6. An apparatus for monitoring security of a registered object distributed in a data processing system, said apparatus comprising:
   means for accessing a library containing a description of the registered object;
   means for receiving a distribution that is sent by an originator to a recipient;
   means for determining if the registered object is present in said distribution; and
   means for executing a predefined action if the registered object is present in the distribution by providing notification of the distribution to a party.

7. The apparatus of claim 6, wherein the library includes a destination indicator for the registered object, a data stream type for the registered object, and an assigned violation type for the registered object.

8. The apparatus of claim 6, wherein the means for executing a predefined action if the registered object is present in the distribution includes means for inhibiting the distribution.

9. The apparatus of claim 6, wherein the means for executing a predefined action if the registered object is present in the distribution includes means for safe storing the distribution.

10. The apparatus of claim 6, wherein the means for notifying a party of the distribution is dependent on an outcome of a prior notification to another party.

11. A method of monitoring security of a registered object distributed in a data processing system, said method being executed on said processing system and comprising the steps of:
   providing means for accessing a library containing a description of the registered object;
   providing means for receiving a distribution that is sent by an originator to a recipient;
   providing means for determining if the registered object is present in said distribution; and
   providing means for executing a predefined action if the registered object is present in the distribution by providing notification of the distribution to a party.

12. The method of claim 11, wherein the library includes a destination indicator for the registered object, a data stream type for the registered object, and an assigned violation type for the registered object.

13. The method of claim 11, wherein the step of providing means for executing a predefined action if the registered object is present in the distribution includes providing means for inhibiting the distribution.

14. The method of claim 11, wherein the step of providing means for executing a predefined action if the registered object is present in the distribution includes providing means for safe storing the distribution.

15. The method of claim 11, wherein the step of providing means for notifying a party of the distribution is dependent on an outcome of a prior notification to another party.

16. A data processing system for monitoring security of a registered object distributed in the data processing system, said data processing system comprising:
   instruction means for accessing a library containing a description of the registered object;
   instruction means for receiving a distribution that is sent by an originator to a recipient;
   instruction means for determining if the registered object is present in said distribution; and
   instruction means for executing a predefined action if the registered object is present in the distribution by providing notification of the distribution to a party.

17. The data processing system of claim 16, wherein the library includes a destination indicator for the registered object, a data stream type for the registered object, an assigned violation type for the registered object.

18. The data processing system of claim 16, wherein the instruction means for executing a predefined action if the registered object is present in the distribution includes instruction means for inhibiting the distribution.

19. The data processing system of claim 16, wherein the instruction means for executing a predefined action if the registered object is present in the distribution includes instruction means for safe storing the distribution.

20. The data processing system of claim 16, wherein the instruction means for notifying a party of the distribution is dependent on an outcome of a prior notification to another party.

21. A method of providing security for distributions going to and from a data processing system, said method being executed on said data processing system and comprising the steps of:
- providing a library of objects, each of said objects have a description of information contained therein
- receiving a distribution that is sent by an originator to a recipient;
- determining if said received distribution contains an object that is provided in said library; and
- providing notification of a user of said data processing system if said received distribution contains a object that is provided in said library.

22. The method of claim 21 wherein said distribution has a destination, further comprising the step of prohibiting said distribution from reaching said destination if said received distribution contains an object that is provided in said library.

23. The method of claim 22 wherein said step of prohibiting said distribution said destination further comprises the step of safe storing said distribution.

24. The method of claim 21 wherein each of said objects in said library has either a first or a second security violation level, wherein said step of providing notification to a user comprises the steps of:
- determining if said object in said received distribution has either said first security violation level or said second security violation level;
- providing notification to the originator of said distribution if said security violation level is a second security violation level; and
- providing notification to a party other than either said originator or recipient of said distribution if said security violation level is a first security violation level.

25. The method of claim 21 wherein each of said objects in said library has a distribution type and a destination, said step of determining if said received distribution contains an object that is provided in said library further comprises the step of accessing said library by said distribution type and said destination for a set of said objects.

* * * * *